Nov. 12, 1957　　　M. S. WORLEY ET AL　　　2,812,827
GAS DEHYDRATION PROCESS AND APPARATUS
Filed June 28, 1956　　　　　　　　　　　　　　4 Sheets-Sheet 1

Marvin S. Worley
Harry L. Johnson, Jr.
Lawrence B. Keel, Jr.
INVENTORS.

BY

ATTORNEY.

Nov. 12, 1957  M. S. WORLEY ET AL  2,812,827
GAS DEHYDRATION PROCESS AND APPARATUS
Filed June 28, 1956  4 Sheets-Sheet 2

Marvin S. Worley
Harry L. Johnson, Jr.
Lawrence B. Keel, Jr.
INVENTORS.

BY
ATTORNEY.

Nov. 12, 1957   M. S. WORLEY ET AL   2,812,827
GAS DEHYDRATION PROCESS AND APPARATUS
Filed June 28, 1956
4 Sheets-Sheet 3

INVENTORS.
Marvin S. Worley
Harry L. Johnson, Jr.
Lawrence B. Keel, Jr.

BY
ATTORNEY.

Nov. 12, 1957 M. S. WORLEY ET AL 2,812,827
GAS DEHYDRATION PROCESS AND APPARATUS
Filed June 28, 1956 4 Sheets-Sheet 4
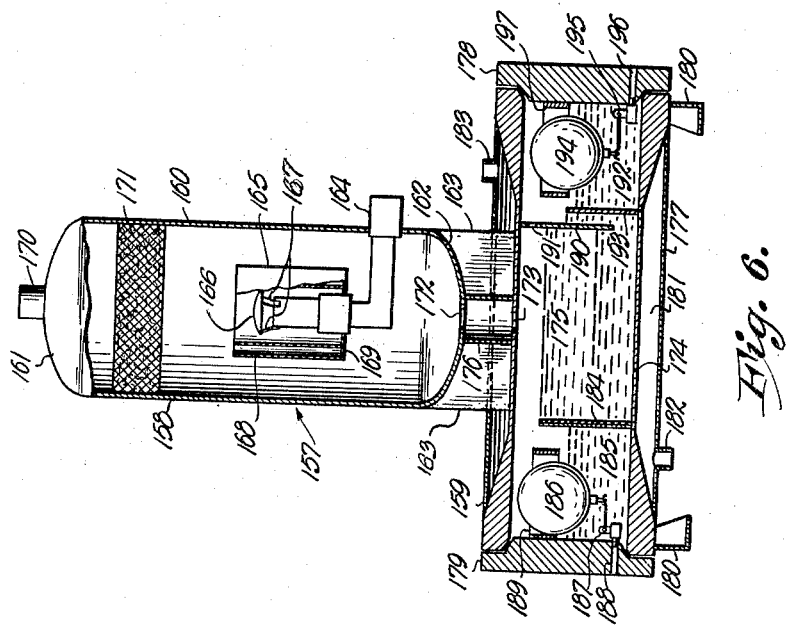
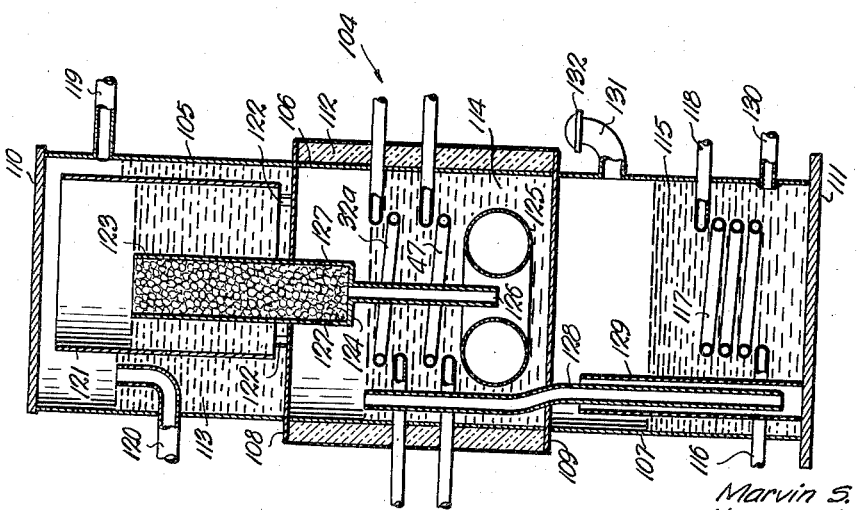
Marvin S. Worley
Harry L. Johnson, Jr.
Lawrence B. Keel, Jr.
INVENTORS
BY
ATTORNEY.

United States Patent Office 2,812,827
Patented Nov. 12, 1957

2,812,827

GAS DEHYDRATION PROCESS AND APPARATUS

Marvin S. Worley and Harry L. Johnson, Jr., Oklahoma City, Okla., and Lawrence B. Keel, Jr., Carmi, Ill., assignors to Black, Sivalls & Bryson, Inc., Kansas City, Mo., a corporation of Delaware Application June 28, 1956, Serial No. 594,555

7 Claims. (Cl. 183—2.7)

The present invention relates generally to a method for dehydrating a fluid stream and in particular to a method for dehydrating a natural gas stream by contacting such stream with a liquid dehydrating agent.

Natural gas flowing from natural gas wells is usually saturated with water vapor. This water vapor can be the source of endless difficulties in processing, handling and transporting the gas. Cooling of the gas will cause condensation of the water vapor and the water will collect in the nearest low point in the system. This collected water will cause undue pressure loss, surging of the gas flowing in the system and may freeze during cold weather causing a complete blocking of the system.

Another reason for the removal of the water vapor from a gas stream is the penalty in price for sales to pipeline companies or possible refusal to purchase by these companies. It has been proven that dehydration of natural gas at wellhead is economically desirable.

Usually these wellhead units are small, skid-mounted units which provide intimate contact between the gas stream and a dehydrating agent. To make these units continuously operable, the dehydrating agent is separated from the gas stream, reactivated by driving off absorbed water and recirculating through the contacting phase of the system in a continuous cycle with only small amounts of dehydrating agent being added to make up for the amounts not separated from the gas stream.

The essential components of equipment of such a system are a contacting device, a dehydrating agent reconcentrating device, a circulating pump for dehydrating agent and in some systems processing a gas stream having free water and other liquids, a liquid knockout or scrubber. These components are utilized most economically by providing a mounting skid on which the components may be mounted.

Prior systems of dehydrating natural gas streams have utilized the same components of equipment mounted on a skid to form a portable unitary structure. One of the factors requiring the most attention in the operation of these prior dehydrating systems is the freezing of the water in the system before it can be contacted by the dehydrating agent. Since the dehydrating agents which are used also have anti-freeze properties, the problem of freezing does not arise anywhere in the system after the dehydrating agent has been introduced. Natural gas streams which are the most plagued by freezing are usually those which produce sufficient water to require the use of an initial scrubber or water separator ahead of the contactor to prevent excessive circulation rates which would be necessary to handle such water loads.

Prior systems have used a portion of the gas which has been processed or other lease gas to power the dehydrating agent pump and as fuel for the reconcentrator. These prior systems have allowed the pump power gas to be exhausted to atmosphere.

After heating the dehydrating agent for its reconcentration, it is desirable and sometimes necessary to cool the reconcentrated dehydrating agent prior to recirculation by the pump to the contactor. This cooling is necessary because the dehydrating agent operates most efficiently at temperatures substantially below reconcentration temperatures. Also, hot dehydrating agent may cause the packing on the pump piston to leak.

Therefore, the primary object of the present invention is to provide an improved method and apparatus for dehydrating natural gas streams. Another object of the present invention is to provide a method and apparatus for dehydrating natural gas streams in which the danger of shutdowns due to freezing is eliminated.

Further objects of the present invention are to provide an improved method and apparatus for dehydrating natural gas streams in which pump exhaust gas is utilized; to provide a skid-mounted natural gas dehydrator in which the skid structure is utilized to function as apparatus in the process in addition to its function as mounting; and, to provide an improved method and apparatus for dehydrating natural gas streams in which the heat in the reconcentrated dehydrating agent is utilized to prevent freezing of free water in the system and to conserve heat within the system.

In accomplishing these and other objects of the present invention, we have provided improved methods and apparatus illustrated in the accompanying drawings wherein:

Fig. 4 is a sectional view of a dehydrating agent reconcentrator.

Fig. 6 is a sectional view of a combination gas scrubber and condensate-water separator.

Figure 1:
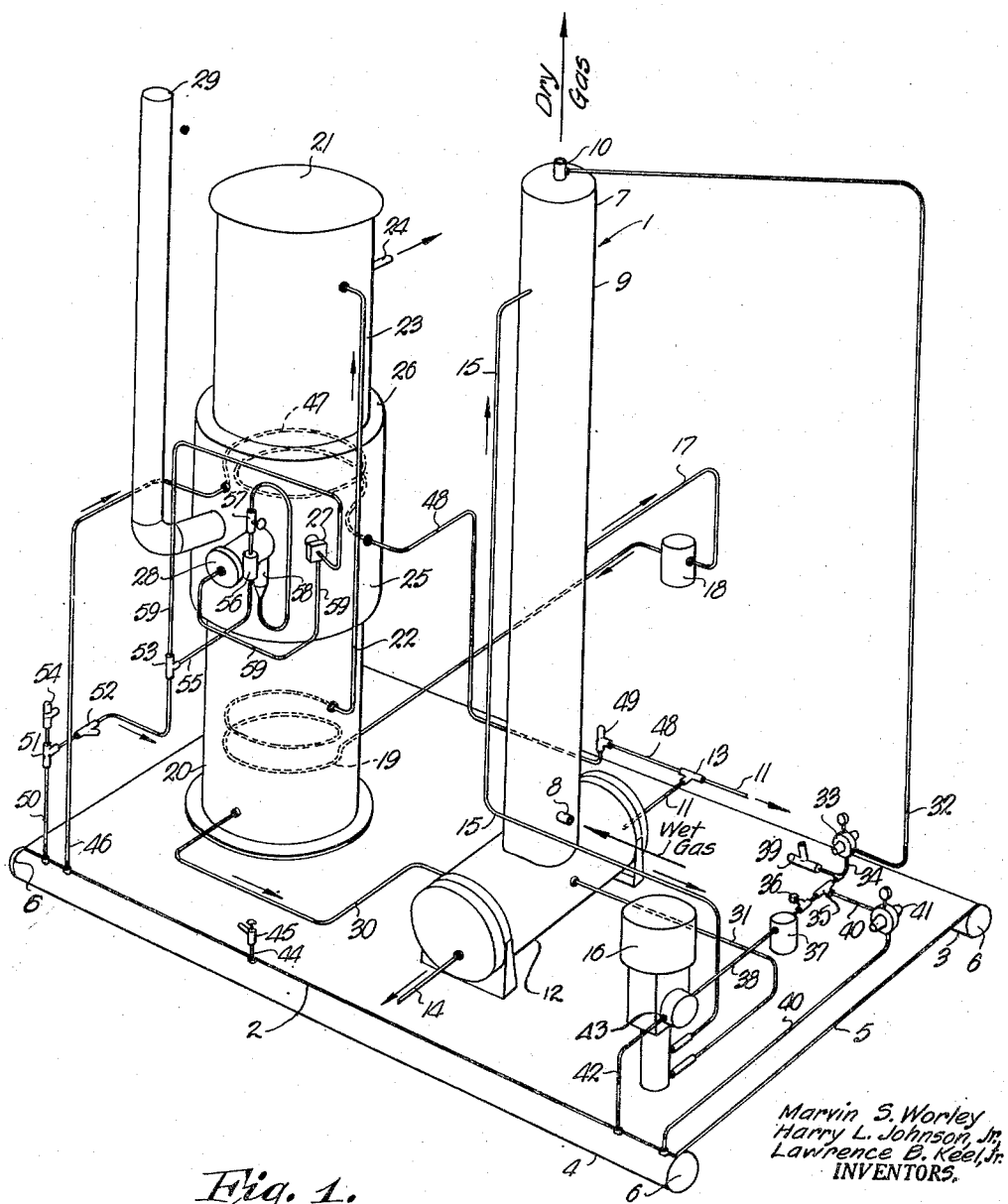
Fig. 1 is a schematic perspective view of a natural gas dehydrator constructed in accordance with the principles of the present invention.

Natural gas dehydrator 1 illustrated in Fig. 1 is a portable, skid-mounted unit designed to dehydrate natural gas streams near their wellheads. In its larger sizes this unit is readily adaptable to dehydrate large volumes of natural gas in gathering systems and pipelines.

As shown in Fig. 1, all of the components of dehydrator 1 are skid-mounted on skid 2. Skid 2 is composed of two tubular members 3 and 4, flooring 5 extending between members 3 and 4 and suitable bracing (not shown) for flooring 5. The ends of tubular members 3 and 4 are closed by heads 6 to form two reservoir pressure vessels. These vessels may be used as surge chambers.

Vessel 7 is a T-shaped combination three-phase separator and contactor. Wet gas inlet duct 8 is connected into the lower portion of vertical contacting section 9 of vessel 7. Dry gas outlet duct 10 extends from the top of vertical section 9. Water outlet duct 11 extends from one end of horizontal separating section 12 of vessel 7 and connects into T 13. Hydrocarbon liquid outlet 14 extends from the opposite end of section 12.

Dehydrating agent inlet duct 15 connects the liquid discharge of pump 16 into the upper portion of contacting section 9 of vessel 7. Dehydrating agent outlet duct 17 extends from a lower position on contacting section 9 through trap 18 and connects into heat exchange coil 19 within reservoir section 20 of reconcentrator 21. Heat exchange coil 19 is conected to reconcentrator inlet duct 22 which extends into separation section 23 of reconcentrator 21. Duct 24 extends from section 23 to exhaust the steam, water vapor and hydrocarbon condensate separated from the dilute dehydrating agent in section 23. Duct 24 should be connected to suitable disposal means to conduct the hydrocarbon condensate away from the heat of heating section 25 to eliminate fire hazard.

Heating section 25 of reconcentrator 21 is positioned between separation section 23 and reservoir section 20 and is surrounded by a layer of insulation designated 26. Thermostat 27 and burner 28 extend into heating section 25 and exhaust stack 29 extends therefrom, bending upwardly and terminating above the uppermost portion of reconcentrator 21 to conduct the exhaust gases away from reconcentrator 21.

The lean dehydrating agent is conducted through duct 30 into a chamber in horizontal section 12 of vessel 7 which is in surrounding relationship to the interior of section 12. This chamber provides an advantageous heat exchange between the hot lean dehydrating agent and the cool separated liquids collecting in horizontal separation section 12. Duct 31 conducts the cooled lean dehydrating agent to pump 16.

Power gas for pump 16 is delivered from gas outlet duct 10 or other suitable source through duct 32 to pressure regulator 33. The gas leaving regulator 33 flows through duct 34, T 35, control valve 36, trap 37 and duct 38 into pump 16. Pressure relief valve 39 is connected into duct 34 between regulator 33 and T 35 to provide relief of any excess pressure which may build up in duct 34 due to a possible faulty operation of regulator 33. By-pass duct 40 extends from T 35 through pressure regulator 41 and connects into tubular member 4 to provide an additional supply of gas when needed. Duct 42 connects the exhaust gas outlet 43 from pump 16 into tubular member 4.

Gas outlet duct 44 extends from tubular member 4 into heat exchange coil 47 within reconcentrator 21 wherein the gas flowing through coil 47 is heated. Duct 48 connects to the outlet of heat exchange coil 47 and extends through back pressure regulator 49 into T 13 in water outlet duct 11. Thus, the warm gas flowing into T 13 will warm any water in water discharge duct 11 and also provide a blow-down of such water collecting in duct 11. With this design it is helpful in the prevention of freezing to locate T 13 as close to section 12 in line 11 as possible to provide a complete clearing of duct 11 each time water is dumped from section 12 of vessel 7. Also, the flow of warm gas through T 13 will provide a sufficient siphoning to clear the water within that portion of water outlet duct 11 between section 12 and T 13 when the valve controlling the water discharge is closed.

Gas outlet duct 50 extends from tubular member 4, through T 51, strainer 52 to T 53. Pressure relief valve 54 is connected to T 51 so that fuel supply piping has adequate provision for pressure relief. Duct 55 extends from T 53, through drip pot 56, valve 57 and into pilot light 58 for burner 28. Duct 59 also extends from T 53 and connects through thermostat 27 to burner 28 to supply fuel gas for burner 28 under control of thermostat 27.

In operation the flow of gas through dehydrator 1 enters vessel 7 through inlet duct 8. The free liquid and liquid mist are separated from the gas and allowed to collect in horizontal section 12 of vessel 7. The hydrocarbon condensate is separated as hereinafter described from the water in section 12 and is discharged therefrom through liquid outlet 14. The separated water is discharged from section 12 through water outlet duct 11.

The gas, free of entrained liquid, is then contacted by a liquid dehydrating agent in contacting section 9 of vessel 7 as hereinafter described and is discharged through dry gas outlet duct 10 to a sales gas line.

The liquid dehydrating agent is pumped into contacting section 9 through dehydrating agent inlet duct 15 by pump 16. The dehydrating agent flows down through section 9, collects and is withdrawn through dehydrating agent outlet duct 17. This dilute agent is delivered through trap 18, heat exchange coil 19 within reservoir section 20 of reconcentrator 21 and inlet duct 22 to separation section 23 of reconcentrator 21. Trap 18 prevents the passage of any gas through duct 17. Dehydrating agent is processed through reconcentrator 21 as hereinafter thoroughly explained and the reconcentrated dehydrating agent is collected within reservoir section 20.

The lean dehydrating agent is delivered to pump 16 through duct 30, the chamber in section 12 of vessel 7 and duct 31.

Pump power gas is delivered to pump 16 through duct 32, regulator 33, duct 34, T 35, valve 36, trap 37 and duct 38. This gas may be supplied from the dry gas flowing to sales lines through outlet duct 10 or other convenient means. Tubular member 3 may be utilized as a high pressure storage vessel for supply gas. The supply gas should be initially regulated to the desired pressure for storage in member 3. Usually this pressure will be higher than the pressure of the pump power gas. As previously mentioned by-pass duct 40 is provided to supply gas to tubular member 4 whenever pump 16 is not using and discharging sufficient gas to maintain the predetermined pressure in member 4.

As previously explained, a portion of the gas from tubular member 4 is conducted through duct 46, heated in heat exchange coil 47 within heating section 25 of reconcentrator 21 and is discharged through duct 48, T 13 and water outlet duct 11 to prevent freezing of the water therein. It is possible to use a control valve in duct 48 therein. It is possible to use a control valve in duct 48 with a time delay attached thereto. Such valve, when installed, may be connected to operate in conjunction with the discharge of water from vessel 7. Thus, the gas flows through duct 48 only when there is a discharge of water from vessel 7 and thereafter remains open for a short period of time allowing hot gas to flow through duct 48 until outlet duct 11 is clear of water. A simple manner of accomplishing this operation would be to have the control valve connected and responsive to the liquid level controller (float or otherwise) which controls the discharge of water from vessel 7 through water outlet duct 11.

As previously disclosed, this same source of gas (tubular member 4) also provides gas for burner 28 and pilot light 58. Strainer 52 is provided in duct 50 to remove solids from the fuel supply gas. Drip pot 56 eliminates any condensation in the gas flowing to pilot light 58 and valve 57 is provided to adjust this gas flow. Thermostat 27 is responsive to the temperatures within heating section 25 of reconcentrator 21 and thereby controls the flow of gas to burner 28 to maintain a substantially constant temperature in section 25.

Figure 2:
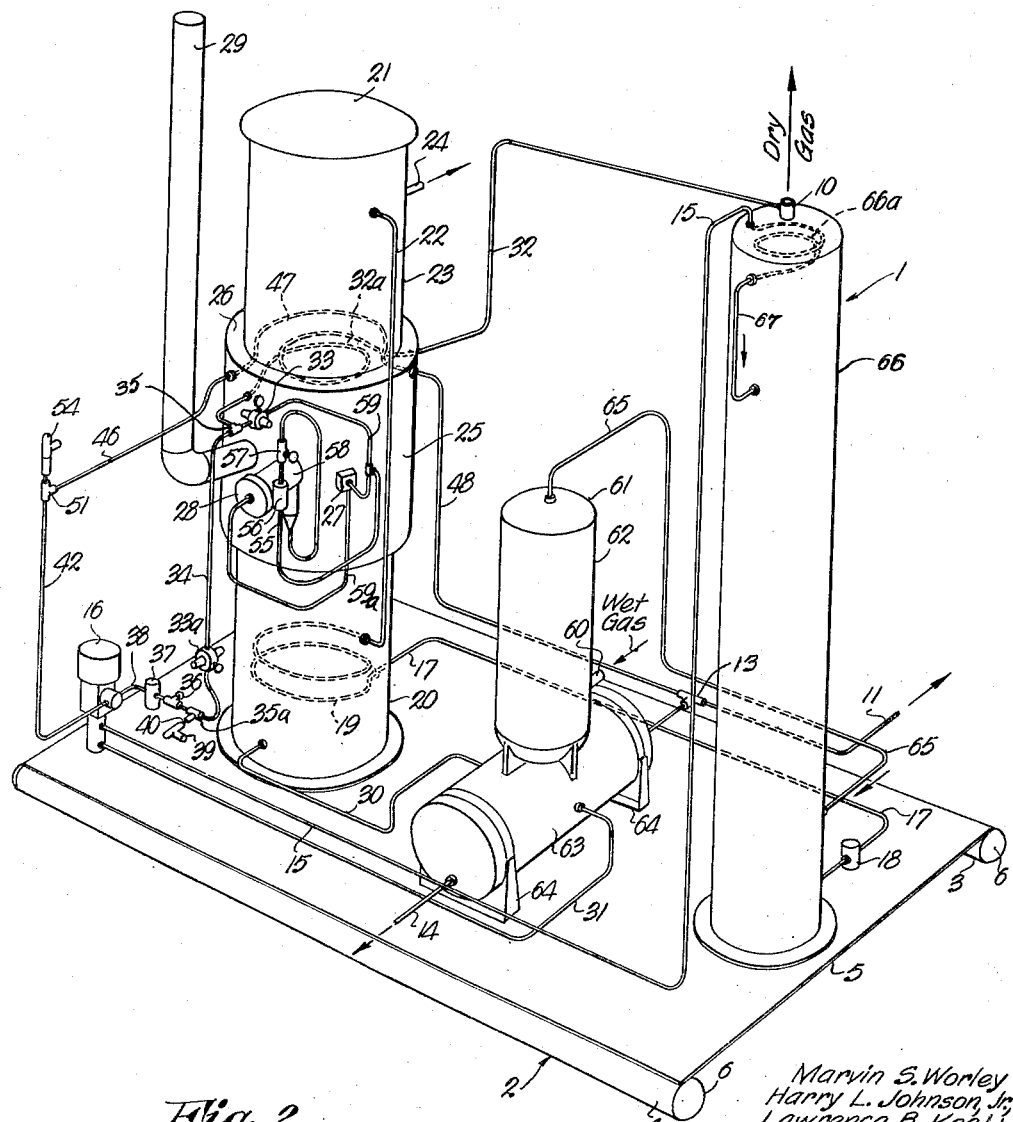
Fig. 2 is a schematic perspective view of a modified form of a natural gas dehydrator constructed in accordance with the present invention.

The dehydrating unit illustrated in Fig. 2 is generally similar to the unit illustrated in Fig. 1 and therefore some numbering of apparatus of Fig. 1 is carried over to the same apparatus in Fig. 2. Fig. 2 is similar to Fig. 1 except a combination gas scrubber, water-condensate separator and a separate contactor are used in the Fig. 2 unit in place of the combination contactor, water-condensate separator of the Fig. 1 unit. Also, the supply gas system for the Fig. 2 unit does not utilize tubular members 3 or 4 for gas storage.

Wet gas inlet 60 connects into the lower portion of vertical scrubber section 61 of scrubber separator 62. Horizontal separator section 63 of scrubber separator 62 is mounted on skid 2 and rests on support members 64. The details of internal structure of scrubber separator 62 are described fully hereinafter with reference to Fig. 6.

Horizontal separator section 63 in Fig. 2 is identical to horizontal separation section 12 in Fig. 1. Hydrocarbon liquid outlet duct 14 extends from one end of section 63 and water outlet duct 11 extends from the other end of section 63. Water outlet duct 11 extends to T 13 where duct 48 is connected to deliver warm gas to aid in the prevention of freezing of the water discharged from section 63 through water outlet duct 11.

Gas outlet duct 65 extends from the upper portion of vertical scrubber 61 and connects into the lower portion of contactor 66. Dry gas is discharged from contactor 66 through dry gas outlet duct 10.

Lean dehydrating agent flows from reservoir section 20 of reconcentrator 21, through duct 30, into the heat exchange chamber in separation section 63, through duct 31, pump 16 and dehydrating agent inlet duct 15 into heat exchange coil 66a within the upper portion of contactor 66. Duct 67 connects from heat exchange coil 66a into contactor 66 to discharge the lean dehydrating agent onto the upper contacting tray of contactor 66. The dilute dehydrating agent is removed from contactor 66 through outlet duct 17, trap 18 and is delivered to reconcentrator 21 as explained previously in the foregoing specification concerning Fig. 1.

Supply gas to power pump 16 and to burn in burner 28 is taken from a source such as dry gas outlet 10 from contactor 66. This supply gas enters through duct 32 and is warmed in heat exchange coil 32a within heating section 25 of reconcentrator 21. The outlet of coil 32a connects into T 35. Fuel gas for reconcentrator 21 flows through regulator 33, duct 59, thermostat 27 and duct 59a to burner 28. Pilot gas flows from duct 59 through duct 55, drip pot 56, valve 57 into pilot light 58.

Pump power gas flows from T 35 through duct 34, regulator 33a, T 35a, control valve 36, trap 37 and duct 38 into pump 16. Duct 40 connects relief valve 39 into T 35a. Pump exhaust gas flows through duct 42, T 51, duct 46, heat exchange coil 47, duct 48 and into T 13 to blow down water from duct 11. Relief valve 54 is positioned on T 51 to provide relief for excess pressures within the exhaust gas ducting. Thus, by providing heat to the supply of fuel and power gas and to pump exhaust gas, complete protection against freezing is provided to the supply gas stream.

The operation of the dehydration unit shown in Fig. 2 is similar to the operation of the unit shown in Fig. 1. The wet gas flows initially through wet gas inlet 60 to be scrubbed of all free and entrained liquids in scrubber section 61.

The remaining liquids are separated into a hydrocarbon phase and a water phase in separation section 63. Each liquid phase is separately discharged from separation section 63, the hydrocarbon phase through hydrocarbon liquid outlet duct 14 and the water phase through water outlet duct 11.

The gas leaving scrubber section 61 through gas outlet duct 65 is substantially free of all entrained liquid but will normally be saturated with water vapor. Since it is the primary purpose of these dehydrating units to remove all free water and a substantial portion of the water vapor contained in the natural gas stream, the gas flows into contactor 66 wherein the water vapor is absorbed from the gas stream. Gas flows upwardly through contactor 66 as hereinafter more fully described and the dehydrating agent absorbs water vapor from the gas which it contacts. The dry gas flows from contactor 66 through dry gas outlet duct 10 and is delivered to a sales gas line or other destination.

Lean dehydrating agent flows from reservoir section 20 of reconcentrator 21 through duct 30, the heat exchange chamber in separation section 63 where the agent is cooled, through duct 31, pump 16 and inlet duct 15 into the upper portion of contactor 66. The dehydrating agent flows through heat exchange coil 66a within contactor 66 wherein the agent is further cooled to a temperature approximating the most efficient absorption temperature and also the dry gas is warmed somewhat by this heat exchange to increase the temperature difference between dew point temperature and the actual gas temperature. This warming of the dry gas is a further step toward the prevention of such a degree of cooling of the gas which would cause water condensation and subsequent freezing of such water. Also, the cooling of the lean dehydrating agent in reservoir section 20, in the heat exchange chamber within separation section 63 and in the upper portion of contactor 66 prior to its contact with the gas stream results in a substantial improvement in efficiency of absorption of the dehydrating agent. Since the dehydrating agent is selected for both its affinity for water at normal atmospheric temperatures and its boiling point being substantially above the boiling point of water so that the absorbed water may be easily boiled out of mixture with the dehydrating agent, the aforementioned cooling therefore increases the absorption efficiency of the dehydrating agent. A preferred dehydrating agent which is found to have the desired characteristics and which is generally utilized by the industry in the dehydration of natural gas is diethylene glycol. Duct 67 connects the outlet of the heat exchange coil 66a within contactor 66 to the inlet into contactor 66 where the dehydrating agent is discharged onto the uppermost contacting tray.

Dilute dehydrating agent flows from contactor 66 through outlet duct 17 and trap 18 into reconcentrator 21. The dilute dehydrating agent is reconcentrated therein as more fully discussed subsequent in this specification and collects in reservoir section 20 to be re-cycled through the contacting system as previously described.

Supply gas is provided from a convenient high pressure source, gas outlet duct 10 in Fig. 2, through duct 32. This gas is then heated in heat exchange coil 32a and delivered to pressure regulator 33. Fuel gas flows from regulator 33, through duct 59, thermostat 27, duct 59a and into burner 28. Pilot gas is taken from duct 59 ahead of thermostat 27 and flows through duct 55, drip pot 56, control valve 57 and into pilot 58.

Power gas for pump 16 is delivered through duct 34, regulator 33a, T 35a, control valve 36, trap 37, duct 38 to pump 16. Relief valve 39 is connected by duct 40 into T 35 to provide adequate protection against excess pressures within the supply system for pump power gas. Exhaust gas from pump 16 flows through duct 42, T 51, duct 46, heat exchange coil 47 within heating section 25 of reconcentrator 21, duct 48 to T 13 and water outlet duct 11. Relief valve 54 is connected into T 51 to provide protection against excess pressures within this pump exhaust gas system. As previously explained, this heated exhaust gas is used to keep water outlet duct 11 free of water. Also, supply gas is heated in heat exchange coil 32a to prevent freezing of the water vapor in the supply gas due to the Joule-Thompson cooling effect of pressure reduction.

From the foregoing it may be seen that we have provided a natural gas dehydrator which will be free of the danger of freezing of the water within the unit and also we have utilized the excess heat within the unit.

Figure 3:
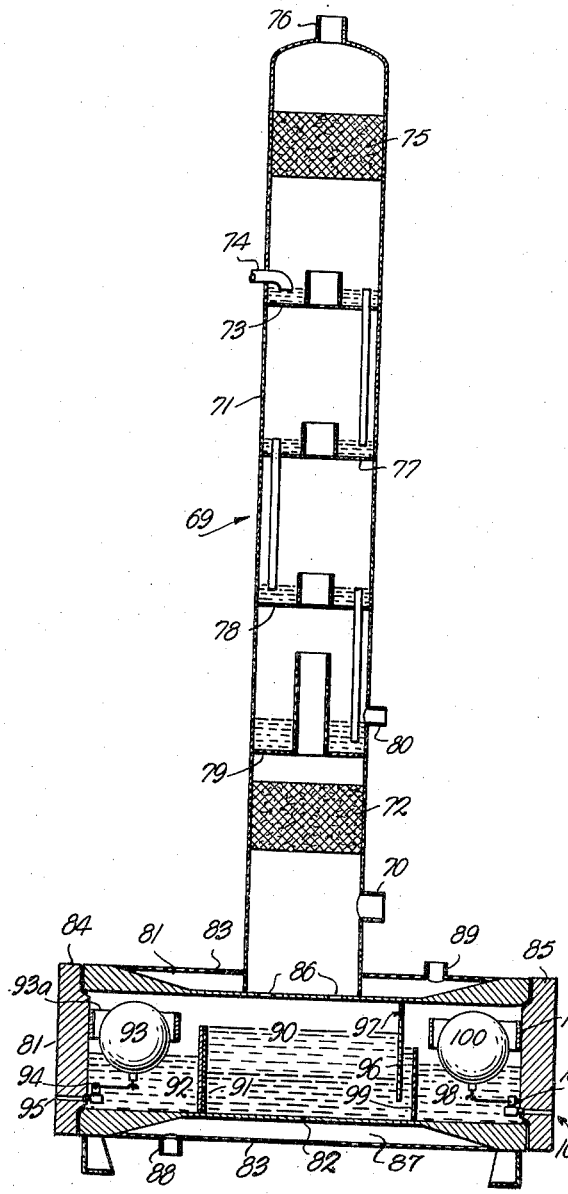
Fig. 3 is a sectional view of a combination separating and contacting vessel.

Fig. 3 illustrates a combination three phase separating and contacting vessel 69 similar to vessel 7 of Fig. 1. Gas inlet duct 70 connects into the lower part of vertical section 71 of vessel 69. Mist eliminator 72 extends across the interior of vertical section 71 at a point above the connection of gas inlet duct 70. Dehydrating agent is discharged onto upper contacting tray 73 through inlet 74. Mist eliminator 75 is positioned across section 71 above inlet 74. Dry gas outlet duct 76 extends out through the upper portion of section 71 above mist eliminator 75. Contacting trays 77 and 78 are positioned in section 71 below tray 73. Chimney tray 79 is positioned in the lower portion of vertical section 71 below tray 78 and above mist eliminator 72. Dehydrating agent outlet 80 extends from vertical section 71 at a position slightly above chimney tray 79.

As may be clearly seen from Fig. 3, horizontal section 81 of vessel 69 is composed of an inner shell 82, an outer shell 83 and end closure plates 84 and 85. Shells 82 and 83 and end closure plates 84 and 85 are secured together forming section 81. Vertical section 71 is secured to horizontal section 81 so that section 71 extends through outer shell 83 and connects to inner shell 82. Inner shell 82 has holes 86 therein and holes 86 are surrounded by section 71. Annular heat exchange chamber 87 is formed between shells 82 and 83 and has an inlet 88 and an outlet 89. The size of holes 86 should be determined by the maximum area which might be needed to pass the liquids separated from the gas stream into liquid collecting space 90. Provided that these holes remain comparatively small, the amount of reinforcement required by pressure vessel codes will be negligible as compared to the reinforcement required when a single hole the size of the inner diameter of section 71 is used. Also, by limiting the size of holes 86, any turbulence from the inlet velocity of the gas will be effectively baffled and space 90 will be free or gas turbulence which would interfere with the gravity separation of liquids therein. Inlet 88 and outlet 89 to chamber 87 should be designed to provide for the uniform flow of warm dehydrating agent and to prevent a collection of cool dehydrating agent therein.

Within liquid collecting space 90 and spaced to one side of holes 86 through inner shell 82, overflow weir 91 is secured to shell 82 and extends upwardly to a height above the center of shell 82. Hydrocarbon liquid collecting space 92 is formed between weir 91 and closure plate 84 within shell 82. Float 93 controls trap mechanism 94 in hydrocarbon outlet duct 95. Cylinder 93a acts as a guide for float 93 in its vertical movement responsive to the hydrocarbon liquid level in hydrocarbon liquid collecting space 92. Underflow weir 96 is positioned in shell 82 at the other side of space 90 from weir 91 and is secured to shell 82 extending downwardly, terminating at a level below the upper edge of weir 91. Hole 97 in the upper portion of weir 96 provides for the equalization of pressure between liquid collecting space 90 and water collecting space 98. Water collecting space 98 is formed between overflow weir 99 and end closure plate 85 within shell 82. Weir 99 is secured to shell 82 extending upwardly to a level slightly below the upper level of weir 91. Float 100 operates trap mechanism 101 which controls the flow of water from space 98 through water outlet duct 102. Cylinder 103 acts as a guide for float 100 in its vertical movement responsive to the water level in water collecting space 98.

The natural gas stream flows through gas inlet duct 70 into the lower portion of vertical contacting section 71 of combination separating and contacting vessel 69. The free liquids in the gas stream descend within vertical section 71 and flow into liquid collecting space 90 through holes 86. The liquids entrained in the gas stream as mist are removed by mist eliminator 72 and drain therefrom through holes 86 into liquid collecting space 90. Since the liquids separated from the gas stream will normally be water and hydrocarbon condensate or oil, a separation of these two components may be accomplished by allowing them to settle and withdrawing the water from the lower portion and the hydrocarbon condensate from the upper portion of the body of collected liquids.

For example, the liquids separated from the gas stream as previously mentioned collect in space 90 which is relatively free of turbulence which might be caused by exposure of space 90 to the entrant gas velocities. Space 90 is protected from these velocities by inner shell 82 which is a sufficient barrier to this turbulence, as previously mentioned, even though holes 86 connect vertical section 71 and space 90 through shell 82.

The hydrocarbon condensate being lighter than water will collect in an upper stratum. Hydrocarbon condensate will flow over weir 91 when sufficient liquid collects in space 90 to build up to the level of the top of weir 91. The hydrocarbon condensate collects in hydrocarbon liquid collecting space 92 and is discharged therefrom through outlet duct 95 under control of trap mechanism 94 in response to the level of liquid in space 92 as transmitted to trap mechanism 94 from float 93.

The water being heavier will collect in a lower stratum and will flow from space 90 under weir 96 and rise in the space between weirs 96 and 99. The upper level of weir 99 is lower than the upper level of weir 91 and if correctly positioned will cause the interface between the hydrocarbon condensate and water to remain substantially below the upper edge of weir 91 and substantially above the lower edge of weir 96. Thus, the water overflows weir 99 and collects in water collecting space 98. The water is discharged from space 98 through outlet duct 102 under control of trap mechanism 101 in response to the level of water as transmitted to trap mechanism 101 from float 100.

As previously mentioned, annular heat exchange chamber 87 formed between inner shell 82 and outer shell 83 provides warming to the water collecting in spaces 90 and 98 to prevent freezing of such water under conditions of extreme cold. This warming of the water also provides cooling for the dehydrating agent flowing through chamber 87. Thus, the dehydrating agent or other warm fluid needing cooling flows into chamber 87 through inlet 88 and is discharged therefrom through outlet 89. Chamber 87 will normally be full of a warm dehydrating agent since outlet 89 is positioned in the uppermost portion of chamber 87.

The gas flowing from mist eliminator 72 is substantially free of entrained liquids which might dilute the dehydrating agent excessively or which in the case of hydrocarbon condensates might contaminate the dehydrating agent. The gas then flows up through chimney tray 79, contacting trays 78, 77 and 73, mist eliminator 75 and is discharged through dry gas outlet duct 76.

The dehydrating agent enters section 71 through inlet 74 and is discharged onto upper contacting tray 73. The agent then flows downwardly over trays 77 and 78 in contact with the upwardly flowing gas and collects on chimney tray 79 and is discharged through outlet 80 from vertical section 71 of vessel 69.

The above described combination separating and contacting vessel is an example of a contactor suitable for this type of unit. As mentioned in the discussion relating to Fig. 2, the contactor may be a separate vessel. Also, such contactor may have a liquid collecting space in its lower portion but no provision for phase separation of the liquids. Another possible variation would be to have a combination contactor-scrubber vessel in which a complete gas-liquid separation such as that accomplished by the scrubber shown in Fig. 6 may be made within the lower portion of the contactor.

Reconcentrator 104 is illustrated in Fig. 4 as a detailed sectional view of a unit similar to reconcentrator 21 in Figs. 1 and 2 and is composed of three cylindrical shell sections, 105, 106 and 107 arranged vertically with partition members 108 and 109 positioned therebetween and flat plates 110 and 111 forming a top and bottom respectively of reconcentrator 104. Plates 110 and 111 are secured in position by bolting, welding or other suitable securing means.

Partition members 108 and 109 extend out beyond the outer circumference of shell sections 105, 106 and 107 to provide support and positioning of insulation 112 surrounding section 106. Partition members 108 and 109 also co-act with shell sections 105, 106 and 107 to form upper separating chamber 113, intermediate heating chamber 114 and lower reservoir chamber 115 in reconcentrator 104.

Coil inlet pipe 116 connects through shell 107 into heating coil 117 which is the same as coil 19 in Figs. 1 and 2. Coil outlet pipe 118 connects to coil 117 and extends out through shell 107. Coil outlet pipe 118 is normally connected to inlet duct 119 which extends into separating chamber 113 through shell 105. Separating chamber discharge duct 120 extends through shell 105 a substantial distance above partition 108 to allow liquids to collect in chamber 113 up to the level of the top edge of duct 120.

Cylindrical member 121 is positioned vertically within chamber 113 and is supported by support members 122 in a position above partition member 108. Cylindrical member 123 extends vertically through and is secured to partition member 108. The upper portion of member 123 is positioned within member 121 but slightly below the level of discharge duct 120. Member 123 is packed with ceramic balls or other suitable packing for still columns. The lower end of member 123 which extends into chamber 114 is closed by plate 124. Extending through plate 124 to a central position in chamber 114 with relation to heating tube 125 is a tube 126. Apertures 127 are provided in member 123 a short distance above plate 124 and below partition member 108.

Stand pipe 128 extends from a level above heating tube 125 down through partition member 109 and terminates a short distance above closure plate 111 within pipe trap 129. The upper edge of pipe trap 129 is substantially above the lower edge of stand pipe 128 and spaced from partition member 109. The lower edge of pipe trap 129 is secured to plate 111. Reservoir outlet 130 extends out through shell 107 at a position near the lower portion of reservoir chamber 115. Filler nozzle 131 extends through shell 107 into reservoir chamber 115 at a position near the upper portion of chamber 115. Filler cap 132 is removably positioned on the exterior end of filler nozzle 131. Filler nozzle 131 is not sealed by filler cap 132 but is open to atmosphere to assure atmospheric pressure in the vapor space of reservoir section 115. Heat exchange coils 32a and 47 are positioned within heating section 114 of reconcentrator 104 as shown.

Reconcentrator 104 functions to drive the diluting water out of mixture with the dehydrating agent. The water-diluted dehydrating agent flows through coil inlet pipe 116 into heating coil 117 in reservoir chamber 115. The dilute dehydrating agent is preheated in flowing through heating coil 117 and the reconcentrated dehydrating agent is thereby partially cooled which is advantageous, as previously explained, beyond the mere conservation of heat which results.

The preheated dehydrating agent passes out through coil outlet pipe 118 and is discharged through inlet duct 119 into separation chamber 113 between shell section 105 and cylindrical member 121. Chamber 113 is sufficiently large to allow any hydrocarbon condensate to rise to the surface of the liquid and to be decanted and discharged together with water vapor and steam flowing out through discharge duct 120. The dilute dehydrating agent settles, being heavier than condensate, and flows under the lower edge of member 121. The liquid level of dehydrating agent rises within member 121 and overflows the upper edge of member 123 into the packed column. The dehydrating agent flowing downwardly therein is stripped of some of its water content by rising hot vapors. The dehydrating agent is discharged into heating chamber 114 through tube 126 near heating tube 125 where it is heated to a temperature at which the water will vaporize and rise as water vapor through apertures 127 and up through the packing in member 123. The dehydrating agent flowing down through member 123 contacts these rising hot vapors and is initially stripped of much of the diluting water and also absorbs any rising dehydrating agent vapors. The hot reconcentrated dehydrating agent in heating chamber 114 spills over into stand pipe 128 and flows down into pipe trap 129. The excess reconcentrated dehydrating agent spills into reservoir chamber 115 and is therein cooled by the dilute dehydrating agent flowing through heating coil 117.

Figure 5:
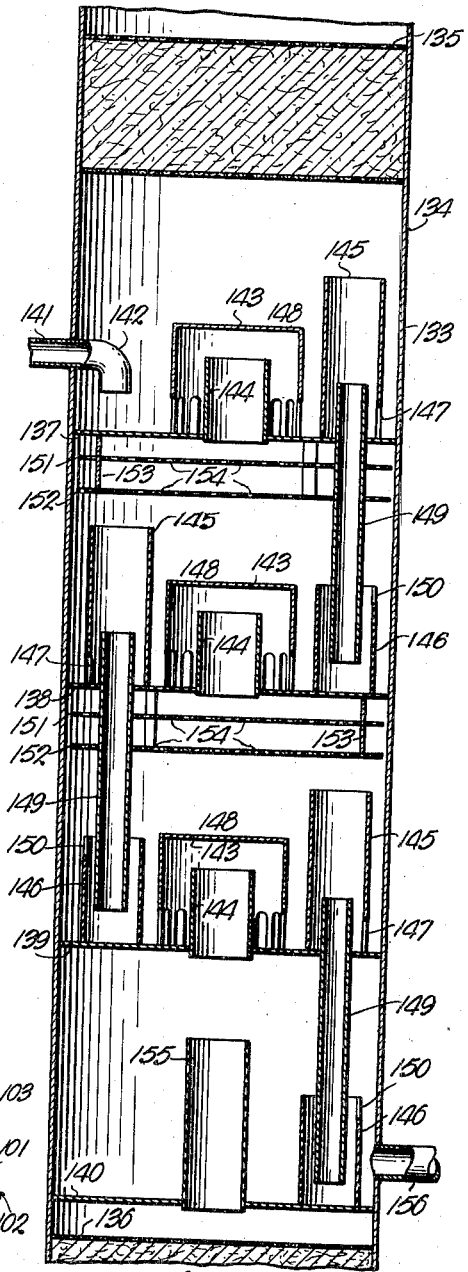
Fig. 5 is a detailed sectional view of the contacting device of the present invention.

Fig. 5 illustrates the details of contacting vessel 133 built in accordance with the present invention and similar to vertical sections 9 and 71 of vessels 7 and 69 in Figs. 1 and 3 and contactor 66 in Fig. 2. Vessel 133 is composed of vertical cylindrical shell 134 having upper mist eliminator 135 and lower mist eliminator 136 extending completely across the interior of shell 134 and spaced a substantial distance from each other to provide the necessary space for contacting trays 137, 138 and 139 and chimney tray 140.

Dehydrating agent inlet duct 141 extends through shell 134 and connects to elbow 142 which extends downwardly terminating a short distance above tray 137 but sufficiently close thereto to be submerged in the pool of dehydrating agent on tray 137. Bubble caps 143 and bubble cap risers 144 are of standard design and are positioned centrally on trays 137, 138 and 139. Obviously, in practice it may be desirable to use more than a single bubble cap on each tray and this may be done without departing from the present invention. Care should be taken to position the bubble caps between the inlet and outlet of the dehydrating agent to assure complete contact on each tray. Downcomer cover cylinders 145 are positioned opposite inlet elbow 142 and downcomer seal pipes 146 on trays 138 and 139. Slots 147 are cut into the lower edge of cylinders 145 on the side away from bubble cap 143. Cylinders 145 extend upwardly terminating above aerated liquid space 148 as hereinafter defined. One of the prime reasons for using cylinders 145 and pipes 146 is to allow the use of a contacting vessel of a much smaller diameter by preventing splashing and by-passing of the tray by the dehydrating agent in the form of foam or froth.

Downcomers 149 extend through trays 137, 138 and 139 from a position within cylinders 145 above the upper edge of slots 147 to a position within downcomer seal pipes 146 and spaced from the next lower tray. The level of the upper edge of downcomers 149 will fix the level of dehydrating agent on each tray. Slots 150 in the upper edge of seal pipes 146 extend down in pipes 146 terminating above the lower edge of downcomers 149 to provide a liquid column gas trap within seal pipes 146. Slots 147 and 150 are at opposite sides of each tray to provide a flow of dehydrating agent completely across each tray and to prevent the dehydrating agent from flowing across a tray without being uniformly contacted by the gas.

Upper and lower perforated baffle plates 151 and 152 are positioned under trays 137 and 138 by clips 153 in spaced relationship to each other. Plates 151 and 152 are perforated to the extent that approximately half their area is open for flow. The upper and lower plates 151 and 152 are positioned so that gas flowing through perforations 154 in lower plate 152 will be forced to change direction to flow through perforations 154 in upper plate 151.

Riser 155 extends up through chimney tray 140 to provide an entrance to the contacting zone of vessel 133 and a collecting space on tray 140 for dilute dehydrating agent which has completed its flow through vessel 133. Outlet duct 156 extends through shell 134 a short distance above tray 140 to provide an outlet from vessel 133 for the dehydrating agent collecting on tray 140.

In operation, gas enters the contacting zone through riser 155 in chimney tray 140. The liquid dehydrating agent collecting in seal pipes 146 will be of sufficient height to cause the gas to flow through bubble risers 144 and caps 143 and prevent by-passing flow of gas up through downcomers 149.

Liquid dehydrating agent is discharged through inlet duct 141 and elbow 142 onto tray 137 where it collects up to the level of the top of downcomer 149 within cylinder 145. Liquid dehydrating agent flows across tray 137, through slot 147 in cylinder 145 and rises within cylinder 145 until it overflows into and through downcomer 149 to collect in seal pipe 146. As previously mentioned, the liquid dehydrating agent collects in seal pipe 146 up to the lower level of slot 150 to provide a liquid trap to prevent the flow of gas up downcomer 149. The liquid dehydrating agent spilling out of slot 150 flows across tray 138 and progresses down to tray 139 and to chimney tray 140 in the manner described above relating to the flow from elbow 142 across tray 137 and down to tray 138.

The gas passes up through bubble cap riser 144 and bubbles out through the slots in bubble cap 143 into the pool of liquid dehydrating agent collecting on tray 139. The gas then passes upward through the perforations 154 in lower perforated baffle plate 152 and then through the perforations 154 in upper perforated baffle plate 151. The gas then repeats the flow up through bubble cap riser 144, bubble cap 143, the liquid dehydrating agent and baffle plates 151 and 152 for trays 138 and 137 and finally flows up through mist eliminator 135.

The foregoing describes the flow through contacting vessel 133 whereby intimate contact between the gas and the liquid dehydrating agent is assured on each contacting tray 139, 138 and 137. Also, it should be noted that the liquid dehydrating agent on the upper tray 137 is in its leanest condition with respect to its water content in comparison to the condition of the liquid on trays 138 and 139. This assures that the maximum amount of dehydration is obtained. If this lean dehydrating agent is diluted on tray 137 by spray or mist carryover from tray 138, the amount of gas dehydration will suffer. Experiments have shown that a reduction in the concentration of a common dehydrating agent such as diethylene glycol of 0.2% concentration may result in the loss of 6° F. of dew point depression. Dew point depression is used herein to mean the difference between the dew point temperature in degrees Fahrenheit of the gas before and after processing. In ordinary bubble tray type of contacting devices this maximum dew point depression is obtained by preventing upper tray contamination by mist carryover from the lower trays by spacing the trays apart. This spacing is costly in contacting vessel since it increases vessel length and therefore vessel cost. Conversely, any contacting tray design which utilizes closer tray spacing than normal and still prevents mist carryover into the upper trays will be less costly. This close spacing advantage is obtained in the contacting device of the present invention since mist carryover is effectively prevented by perforated baffle plates 151 and 152. It has been found that by use of these baffle plates that tray spacing may be reduced substantially. To accomplish this, baffle plates 151 and 152 have been designed to reduce mist carryover to a negligible amount in the space provided.

Another feature of the present invention is the provision preventing by-passing of the trays by the dehydrating agent. Thus, flow of uncontacted liquid dehydrating agent into downcomers 149 is effectively prevented by the use of cylinders 145. Cylinders 145 surround the upper open end of downcomers 149 at a height sufficient to extend above the expected uppermost level of aerated liquid space 148. The aerated liquid space is herein used to mean that space above the contacting tray in which the liquid dehydrating agent and the bubbles of gas therein are contained. Thus, by positioning cylinders 145 around downcomers 149 and by positioning slots 147 in the side of cylinders 145 away from bubble cap 143, the even flow and contact of liquid dehydrating agent with the gas is assured.

Scrubber separator 157 shown in Fig. 6 is a detail design of a unit such as scrubber separator 62 of Fig. 2. Scrubber separator 157 is composed of vertical scrubbing section 158 and horizontal separating section 159. Vertical scrubbing section 158 is composed of a cylindrical shell 160, upper and lower dished heads 161 and 162 and support brackets 163 securing section 158 in a position on the upper central portion of section 159. Gas inlet duct 164 extends through shell 160 and into the central portion of section 158 and is bent upwardly therein terminating within mist eliminator 165. Deflector 166 is secured to the end of duct 164 within mist eliminator 165 by tie bars 167 so that its concave side faces downwardly toward the open end of duct 164.

Mist eliminator 165 is composed of screen 168 or other suitable coalescing material wound spirally around the end of duct 164 and deflector 166 and screen support 169 to which the lower edge of screen 168 is secured. Support 169 usually may be a flat member extending out to the outside diameter of the spiral of screen 168 in length and of a width sufficient only to be secured to duct 164. Gas outlet duct 170 extends through head 161 and mist eliminator 171 extends across the interior of shell 160 above mist eliminator 165 and below gas outlet duct 170.

The liquids coalesced by mist eliminator 165 drain into the lower portion of scrubber section 158 and flow through hole 172 in dished head 162 and hole 173 in inner shell 174 of separator section 159 into liquid collecting space 175. Tubular member 176 is secured to dished head 162 around hole 172, to inner shell 174 around hole 173 to provide a connection to contain the liquid flowing from scrubbing section 158 to separating section 159 and to outer shell 177.

Separating section 159 is composed of inner shell 174, outer shell 177, end closure plates 178 and 179 and supports 180. Annular heat exchange chamber 181 is formed between shells 174 and 177 and has an inlet 182 and an outlet 183.

Within liquid collecting space 175 and positioned to one side of hole 173, overflow weir 184 is secured to shell 174 and extends upwardly to a height above the center of shell 174. Hydrocarbon liquid collecting space 185 is formed between weir 184 and closure plate 179 within shell 174. Float 186 controls trap mechanism 187 in hydrocarbon outlet duct 188. Cylinder 189 acts as a guide for float 186 in its vertical movement responsive to the hydrocarbon liquid level in space 185. Underflow weir 190 is positioned in shell 174 at the other side of space 175 from weir 184 and is secured to shell 174 extending downwardly so that its lower edge is substantially below the level of the upper edge of weir 184 and is spaced from the lower inner surface of shell 174. Weir 190 contains apertures 191 to provide for the equalization of pressures between space 175 and water collecting space 192. A second overflow weir 193 is positioned between weir 190 and closure plate 178 and is secured to shell 174, extending upwardly above the lower edge of weir 190 and terminating at a level slightly below the upper edge of weir 184. Water collecting space 192 is formed between weir 193 and closure plate 178 within shell 174. Float 194 operates trap mechanism 195 which controls the flow of water from space 192 through water outlet duct 196. Cylinder 197 acts as a guide for float 194 in its vertical movement responsive to the water level in space 192.

In operation, the natural gas stream flows into scrubbing section 158 through gas inlet duct 164 and is directed against the concave side of deflector 166. The stream is directed outwardly and downwardly with the liquids continuing in such direction to collect on screen 168 or the inner walls of shell 160. The gas will turn to flow upwardly through mist eliminator 171 and out through gas outlet duct 170. The liquids separated from the gas stream will drain downwardly and be collected in liquid collecting space 175 within separating section 159.

The operation of separating section 159 of scrubber separator 157 is exactly the same as the operation of section 81 of vessel 69 in Fig. 3. Thus, the hydrocarbon condensate is discharged from separating section 159 through outlet duct 188 and the water is discharged from section 159 through water outlet 196. Warm lean dehydrating agent or other suitable warm heat exchange medium is circulated into chamber 181 through inlet 182 and discharged therefrom through outlet 183 to prevent freezing of the water in separating section 159.

The primary function of a scrubber in a natural gas dehydrating system is to eliminate the load upon the dehydrating agent system by initially removing the free and entrained liquids from the gas stream. This is accomplished in scrubber section 158 of scrubber separator 157. The separated liquids are delivered to separating section 159 where the valuable hydrocarbon liquids are decanted from the water and sent to a suitable storage and the water is discharged to suitable disposal means.

Since the primary purpose of using a scrubber in a natural gas dehydrating system is to remove liquids, the design of scrubbing section 158 is directed solely to this purpose. The design of mist eliminator 165 and deflector 166 has been found to be very efficient in the removal of free and entrained liquids from the gas stream. This is accomplished by directing the gas through a flow path in which the gas is caused to change its direction of flow at least twice. It is commonly known that a reversal of direction of the flow path of a gas will cause any liquid in the gas to attempt to resist such change of direction more than the gas because of the wide difference between their weights and the concomitant greater amount of inertial force in the liquid resisting a change in direction of flow. This natural incident to a change of direction of flow is best utilized by providing a surface on which the liquids may collect. This surface should be positioned on the outside of the turn to obstruct the liquid path. Once contact has been established, the natural wetting characteristics of liquid will tend to resist re-entrainment into the gas stream. Also the collection of a quantity of liquid mist on a surface will tend to form larger drops. These larger drops of liquid will be of sufficient weight to drain to the lower portion of scrubber 157 and will also be large enough to fall downwardly through the gas without being re-entrained.

Thus, from the foregoing it may be seen that we have provided an improved method and apparatus for dehydrating natural gas streams. The present method and apparatus minimizes the possibility of freeze-ups of the unit; utilizes available heat source within the unit to improve efficiency of operation; utilizes the exhaust gas from the dehydrating agent pump within the unit; and utilizes a mounting skid to provide supply gas storage.

What we claim and desire to secure by Letters Patent is:

1. The method of dehydrating a natural gas stream comprising, initially removing free and entrained water from said stream, contacting said stream with a liquid dehydrating agent, separating the dilute dehydrating agent from said stream, reconcentrating said dilute dehydrating agent, pumping the reconcentrated agent into contact with said gas stream, flowing a portion of said gas stream after contact to a high pressure supply gas zone, flowing a portion of the gas from said high pressure supply gas zone to power said pumping, flowing the exhaust gas from said pumping to a low pressure supply gas zone and flowing a portion of the gas from said low pressure supply gas zone into heat exchange relation with the removed free and entrained water to prevent freezing of said water.

2. The method of dehydrating a natural gas stream according to claim 1 including, heating said supply gas from said low pressure supply gas zone prior to flowing said gas into said heat exchange relation.

3. The method of dehydrating a natural gas stream according to claim 1 including, discharging said water through a discharge duct, flowing a second portion of said supply gas from said low pressure supply gas zone through said discharge duct to blow said water through said discharge duct.

4. A natural gas dehydrator comprising, separating means for removing free and entrained liquids from the natural gas stream, an inlet into said separating means, contacting means, means connecting said separating means and said contacting means to conduct the natural gas stream to said contacting means, a gas outlet from said contacting means, a dehydrating agent inlet into said contacting means, a dehydrating agent outlet from said contacting means, a dehydrating agent reconcentrator, said reconcentrator having a separating section, a heating section and a reservoir section, a heat exchange coil within said reservoir section, means connecting said dehydrating agent outlet to said heating coil, means connecting said heating coil into said separating section of said reconcentrator, a heat exchange chamber surrounding said separating means, means connecting said chamber to said reservoir, duct means connecting said chamber to said dehydrating agent inlet and a pump in said duct means.

5. A natural gas dehydrator according to claim 4 including, a high pressure supply gas vessel, a low pressure supply gas vessel, supply means for supplying gas to said high pressure supply gas vessel, means connecting said high pressure supply gas vessel to said pump, and means connecting the exhaust of said pump to said low pressure supply gas vessel.

6. A natural gas dehydrator according to claim 5 including, a framework joining said high and low pressure supply gas vessels to form a skid on which said pump, said separating means, said contacting means and said reconcentrator are portably mounted.

7. Invention according to claim 5 including, a burner in said heating section of said reconcentrator, a gas line connecting said low pressure supply gas vessel to said burner, and a duct connecting said low pressure supply gas vessel through the heating section of said reconcentrator to the discharge duct from said separating means to conduct heated gas through said discharge duct.

References Cited in the file of this patent

UNITED STATES PATENTS

| | | |
|---|---|---|
| 2,235,322 | Martin | Mar. 18, 1941 |
| 2,248,956 | Carvlin | July 15, 1941 |
| 2,675,884 | Deanesly | Apr. 20, 1954 |
| 2,735,506 | Glasgow | Feb. 21, 1956 |
| 2,758,665 | Francis | Aug. 14, 1956 |